United States Patent [19]
Nehls

[11] Patent Number: 4,822,199
[45] Date of Patent: Apr. 18, 1989

[54] MODULAR FRAME STRUCTURE

[75] Inventor: Charles O. Nehls, Allen Park, Mich.

[73] Assignee: Unistrut International Corp., Wayne, Mich.

[21] Appl. No.: 83,252

[22] Filed: Aug. 10, 1987

[51] Int. Cl.⁴ .............................................. F16D 1/00
[52] U.S. Cl. ..................................... 403/171; 403/176
[58] Field of Search ................. 403/171, 172, 176, 341

[56] References Cited

U.S. PATENT DOCUMENTS

| | | | |
|---|---|---|---|
| 2,976,968 | 3/1961 | Fentiman | 189/34 |
| 3,270,478 | 9/1966 | Attwood | 52/648 |
| 3,632,147 | 1/1972 | Finger | 287/189 |
| 4,129,975 | 12/1978 | Gabriel | 52/648 |
| 4,131,380 | 12/1978 | Bliquy | 403/217 |
| 4,283,156 | 8/1981 | Harper, Jr. | 403/218 |
| 4,355,918 | 10/1982 | Van Uliet | 403/170 |
| 4,637,193 | 1/1987 | Lange | 403/176 X |
| 4,679,961 | 7/1987 | Stewart | 403/341 |

FOREIGN PATENT DOCUMENTS

| | | | |
|---|---|---|---|
| 2262770 | 9/1975 | France | 403/171 |
| 10330 | 5/1913 | United Kingdom | 403/341 |

*Primary Examiner*—Andrew V. Kundrat
*Attorney, Agent, or Firm*—Gifford, Groh, Sheridan, Sprinkle and Dolgorukov

[57] ABSTRACT

A modular frame structure having a cooperating strut coupling and a connection node coupling which permits quick assembly and release. A method is presented for preassembly of the node couplings to the connection nodes to hasten field assembly. A method is also provided for connecting a strut to connection nodes which are fixed in space by the portion of the frame structure already assembled.

13 Claims, 3 Drawing Sheets

MODULAR FRAME STRUCTURE

This invention relates to a modular frame structure and a method of assembly, and, more particularly, to a quick connect-disconnect assembly of greatly improved structural integrity under both tension and compression loading.

Space frames are well known, and there are various designs directed to modular concepts which reduce the on-site construction time, contribute to the aesthetics of the finished structure, and allow the components to be reused in reproducing a given structure or in assembling a new structure.

In producing a modular design for construction of a three-dimensional structure, three basic component parts are essential: namely, an elongate frame member or strut, a connecting hub or node to which the struts are connected, and a connecting means or a coupling means which joins the strut to the node. Particularly where a quick connect-disconnect structure or quick release is contemplated, a fourth component might be delineated as a latch or containment means.

It is to an improved quick release modular frame structure to which this invention is directed.

It is a primary objective of this invention to provide a modular frame structure which has greater structural strength than conventional threaded or bolted structures, but still provides a rapid or quick release feature.

It is a further object of this invention to provide a method of assembly of a modular frame structure in which the position of the strut members can be predetermined and partially assembled prior to field assembly of the individual strut members.

It is yet a further object of this invention to provide a method of assembling additional struts to a partially constructed frame structure in which the nodes are already fixed in space without the necessity of disconnecting or partially disconnecting certain of the strut members from the nodes to add the additional strut member.

Further objects and advantages of the present invention will become apparent from a description of the modular frame structure and the method of assembly. The three essential elements include the node which has a plurality of threaded apertures arranged in a predetermined pattern extending through its outer surface, a strut which is designed to extend between adjacent nodes in forming the frame structure, and a coupling which is used to connect the strut to a node.

The coupling embraces two complementary parts, a node coupling and a strut coupling. The node coupling has one end threaded for engagement with one of the threaded node apertures and an elongated tang at its other end. The tang can be formed from a cylindrical portion with a segment which has been removed to form a segmental shaped inner planar wall and the tang which extends longitudinally from the wall with a segmental cross-section. The strut coupling is permanently attached to a strut at one end and has an elongated tang at its other end. The strut tang is formed for complementary contact with the node tang from a cylindrical portion with a segment removed to form a segmental shaped inner planar wall and the tang which extends from the planar wall also having a segmental cross-section. Each of the tangs has a hole extending through the planar surface of the segmental shaped cross-section with one of the holes in the two tangs being sized to receive a dowel pin with a pressed fit and the hole in the other of the tangs receiving the dowel pin in a sliding engagement. The holes are positioned longitudinally in the tangs so that when the dowel pin is in engagement with both holes, the ends of each tang abut the inner planar walls of the other coupling thereby holding the node and strut couplings in fixed longitudinal alignment joining the strut to the node.

The fourth component is a latch or containment means which is movable from a first position, allowing quick release or the engagement and the disengagement of the coupling, to a second position, which prevents the release of the couplings.

As will be more fully developed, the coupling at one end of the strut is fixed, and at the other end of the strut the coupling is rotatable. The node coupling which threads into the node is identical for both strut couplings; the strut coupling is fixedly attached to the strut at one end and is rotatably attached to the strut at the other end.

In providing the rigid attachment, the strut coupling has a longitudinally extending cylindrical surface from its tang end to its attachment end and conveniently has an outwardly extending stop collar portion intermediate its ends which allows the cylindrical portion at the attachment end of the strut to be inserted into the strut member to abut the collar against the end of the strut for permanent attachment. Typically, the collar is welded to the strut tubing.

In order to provide a rotatable or swiveling strut coupling for permanent attachment to the other end of the strut, the strut coupling element has two parts: a tubular a element, and a swivel element. The tubular element has a tubular body, one end of which extends into and is permanently attached to the strut as by the use of an outwardly extending stop collar. The other end of the tubular element extends outwardly from the strut. The swivel element is internally threaded at one end and has a cylindrical portion at its other end with a segment removed to form a segmental shaped inner planar wall and a tang with a segmental cross section which extends outwardly from the planar wall. A shoulder screw extends through the tubular body of the tubular element into threading engagement with the swivel element drawing them into adjacent proximity with the swivel element in abutment with the screw shoulder.

A strut can be attached to a node at its fixed coupling end by rotation of the entire strut as the two couplings elements are engaged. The strut can then be attached at its other end by rotation of the node coupling and the swivel element relative to the tubular element in the strut. Where both nodes to which the strut is being attached are fixed in an already assembled portion of the modular frame structure, one or both of the node couplings can be threaded into the respective nodes, and the strut with its coupling can be assembled thereto without the necessity for loosening or disassembling the previously rigidly assembled portion of the structure.

At both the fixed and rotatable coupling ends of the strut, the latch or containment means preferably takes the form of a containment sleeve which extends over the strut end and is movable from a first position, covering the couplings thus preventing their release, to a second position, exposing the couplings for engagement and disengagement.

With either the rotatable or fixed strut coupling, the permanent attachment to the strut is preferably by insertion of an end portion of the coupling into the strut and welding an abuting collar to the strut. This presents a longitudinally extending cylindrical surface from the tang to the attachment collar. In a preferred embodiment each of the node couplings has an annular shoulder between its threaded end and its cylindrical portion. The latch then includes a helical spring which extends over the longitudinally extending cylindrical surface of the strut coupling. A containment sleeve extends over the spring and a portion of the strut and has an internal shoulder which engages one end of the spring to hold the other end of the sleeve against the annular shoulder of the node coupling with the spring in a partially compressed condition and the sleeve preventing release of the couplings in a first latch position. The sleeve is movable over a further portion of the strut, compressing the spring further which exposes the ends of the tangs for release or disengagement and engagement of the couplings in a second latch position.

A unique method of assembling the modular frame structure involves the steps of:

threading node couplings into the individual nodes to establish connection points for the frame structure;

selecting a strut and sliding a containment sleeve at one end of the strut to expose the strut coupling;

connecting the one end of the selected strut to one of the nodes at a preselected point by locking the complementary tangs of the strut and the node couplings;

sliding the containment sleeve on the selected strut over the tang connection;

sliding a containment sleeve at the other end of the selected strut to expose the strut coupling;

connecting said other end of the selected strut to the another one of the nodes at a preselected point by joining the tangs of the strut and the node couplings; and sliding the containment sleeve on the selected strut over the tang connection at the other end of the selected strut.

The steps of selecting an additional strut and assembling it to the modular frame structure are repeated until the modular frame structure has been constructed in accordance with the pattern established by the initial step of threading the node couplings into the individual nodes.

The method of connecting a strut between two nodes which have been fixed in space by a partially assembled frame structure involves the step of threading a node coupling into one of the fixed nodes before or after the node coupling is joined to a strut coupling. A node coupling is threaded into the other node before it is joined to the other strut coupling.

The objects of this invention are accomplished by the embodiments disclosed in the following description and illustrated in the drawing in which.

Figure 1:
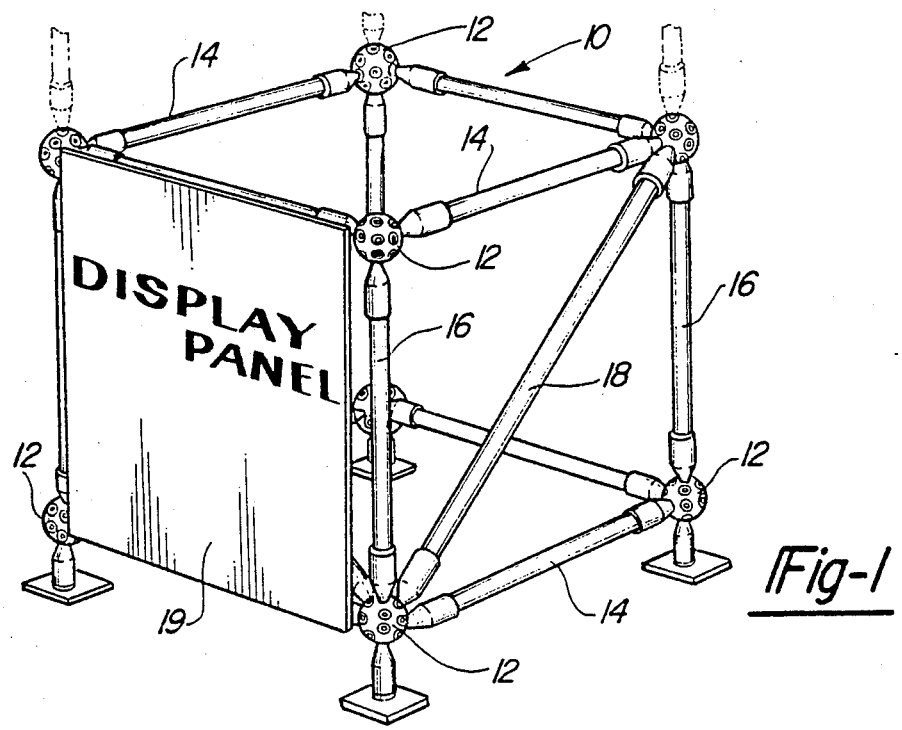
FIG. 1 is a perspective view showing the construction of a modular frame structure using the elements of this invention.

Referring to FIG. 1, the modular frame structure 10 is shown in the process of being constructed with individual node connectors 12, and a plurality of orthogonally disposed horizontal struts 14 and vertical struts 16, and diagonally disposed struts 18. Connection nodes 12 are supplied with a plurality of threaded apertures arranged in a predetermined pattern in order to provide the orthogonal, horizontal and vertical connections, and the diagonal reinforcing connections where necessary. Wall panels 19 can be attached to the frame structure by any suitable means which does not form a part of this invention.

Figure 2:
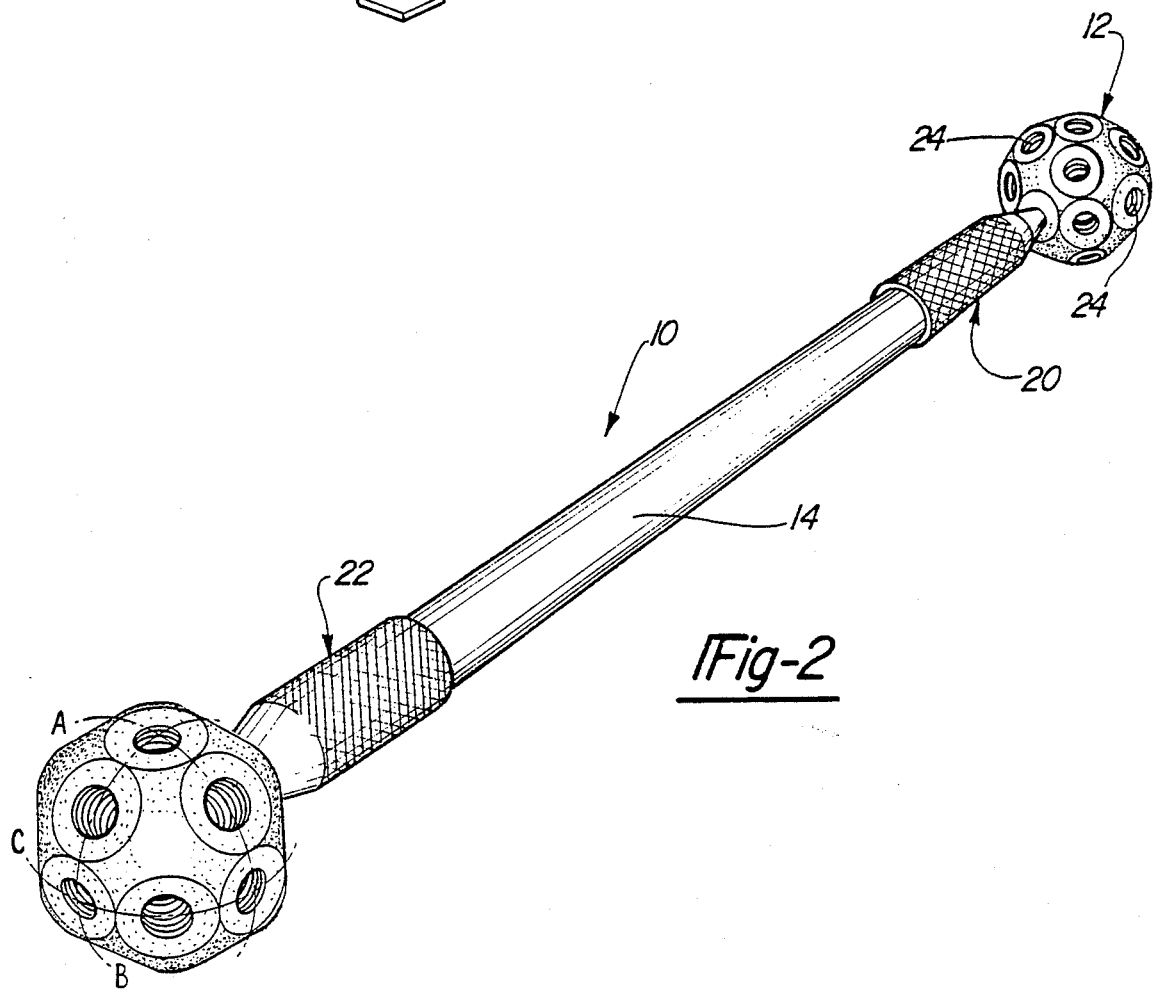
FIG. 2 is a perspective view of completed connection between a strut member and two adjacent nodes, the details of the coupling means of this invention being hidden by latch containment sleeves.

In order to provide the mutually perpendicular orthogonal connection points along with diagonal connection points at 45° in any direction, a minimum of nine pairs of aligned apertures are necessary with the axes of the pairs passing through the center point of the node. That is, as shown in FIG. 2, there would be four pairs in the three mutually perpendicular planes AA, BB and CC or eight equally spaced apertures, 45° apart in each plane. This overlapping symmetry requires a total of 18 holes. Other arrangements to provide 30° and 60° diagonal capabilities would obviously require a considerably larger number of symmetrically arranged apertures.

Figure 3:
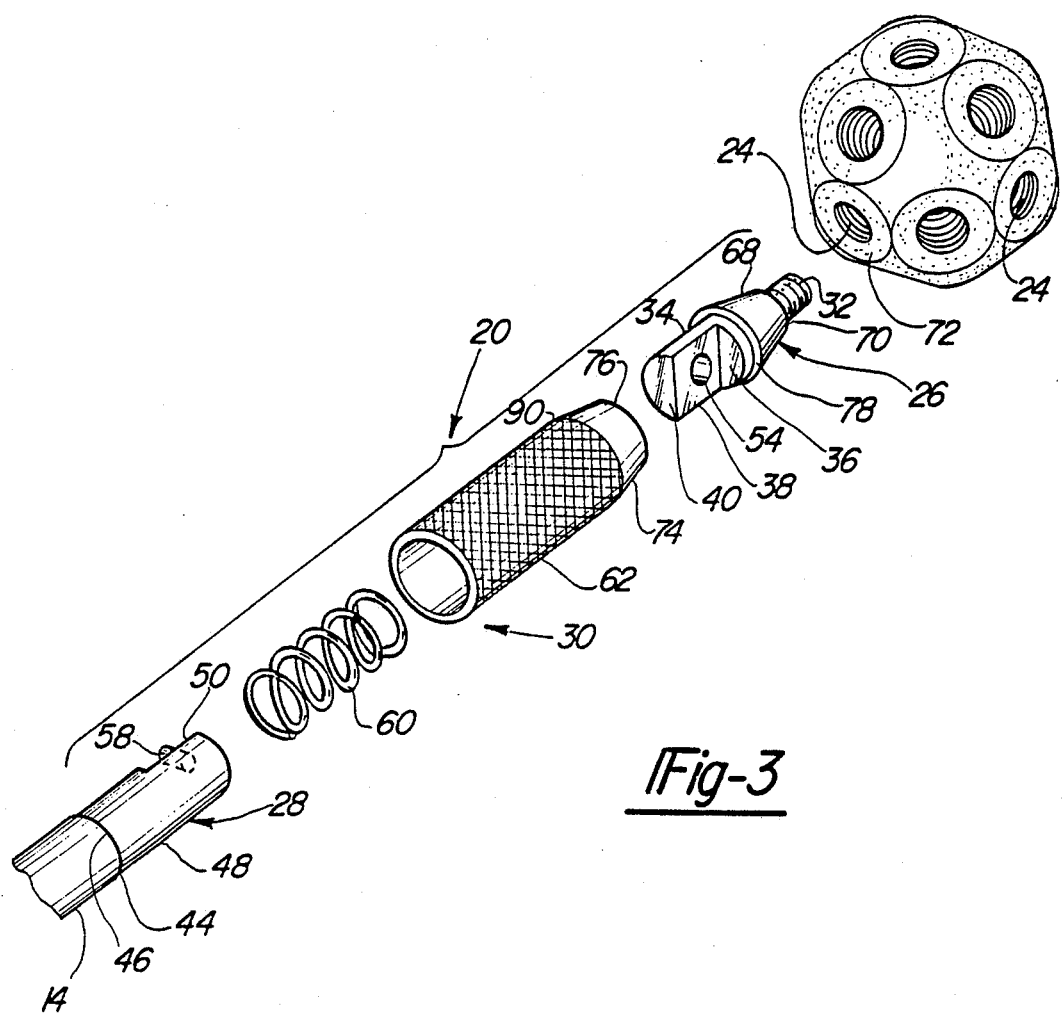
FIG. 3 is an exploded perspective view showing one end of a strut with a fixed, non-rotatable coupling connected to the strut and a node coupling positioned to be threaded into the node and further showing the relationship of the sliding containment sleeve.
Figure 4:
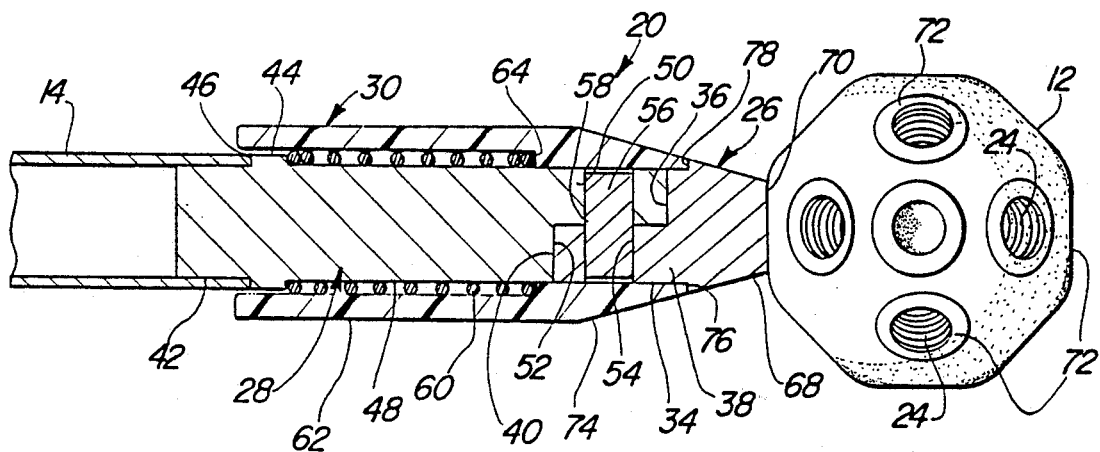
FIG. 4 is a cross-sectional view showing the details of the fixed coupling means of FIG. 3 including the node coupling and strut coupling engaged and the node coupling engaged with the node with the latching containment sleeve in position to prevent release of the couplings.
Figure 5:
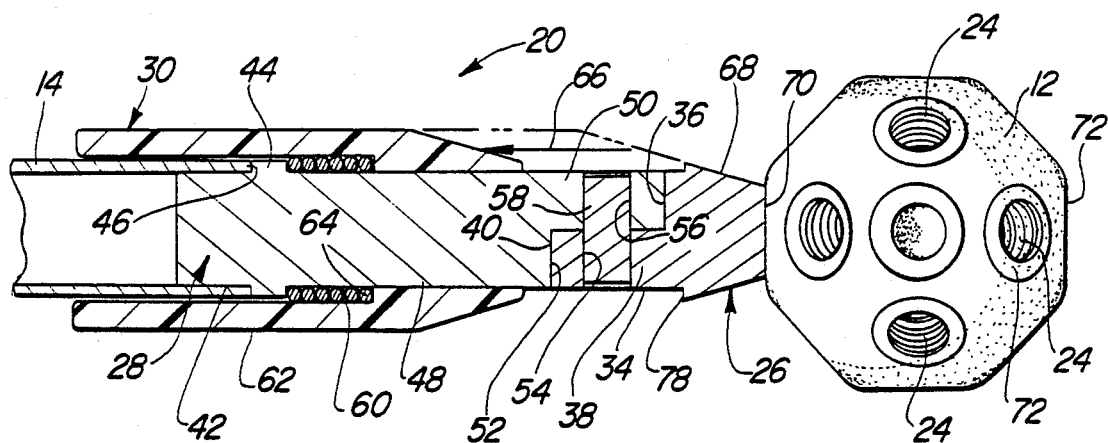
FIG. 5 is a cross-sectional view similar to FIG. 4 with the latching sleeve slid to an open position to permit release of the node coupling from the strut coupling.
Figure 6:
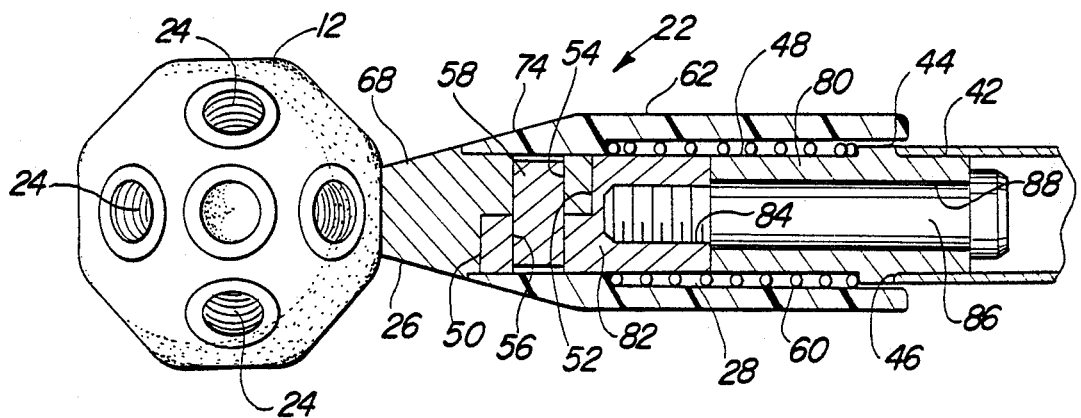
FIG. 6 is a cross sectional view similar to FIG. 4 showing a rotatable coupling structure of this invention.

As seen in FIG. 2, coupling assemblies 20 and 22 are located at each end of strut 14 providing a threaded connection to the threaded apertures 24 of nodes 12. Coupling assembly 20 provides a fixed connection relative to strut 14 so that the entire strut 14 can be rotated as coupling assembly 20 is threaded into an aperture 24 of node 12; the details of this structure are shown in FIGS. 3–5. Coupling 22, the details of which are shown in FIG. 6, provides relative rotation between its threaded portion connected to node 12 and its portion connected to strut 14.

The fixed coupling assembly 20 as shown in FIGS. 3–5 includes a node coupling 26, a strut coupling 28, and a containment latch 30.

The node coupling 26 has a threaded stud end 32 for engagement with a threaded node aperture 24, and a cylindrical portion 34 at its other end. A segment is removed from end 34 to form a segmental shape inner planar wall 36 and a longitudinally extending tang 38 with a segmental cross-sectional end 40.

The strut coupling 28 has a cylindrical strut attachment portion 42 which extends into the end of tubular strut 14 and an outwardly extending stop collar 44 which abuts against the end of the strut 14. Strut coupling 28 is permanently attached to strut 14 as by a butt-weld 46 at the juncture of the collar 44 with the strut end. Strut coupling 28 has a cylindrical portion 48 extending from collar 44 and ending in a segmental shape tang portion 50. The removal of a segmental portion to form tang 50 also forms a segmental inner planar wall 52. Each of the node coupling tang 38 and the strut coupling tang 50 has a hole 54 and 56 for receiving dowel pin 58. Dowel pin 58 is received with a pressed fit in strut coupling hole 56 and with a sliding fit in node coupling hole 54. Alternatively the dowel pin 58 could be received in hole 54 with a press fit and into hole 56 with a sliding fit. Holes 54 and 56 are so positioned along their respective tangs 38 and 50 so as to receive the dowel pin 58 therebetween and be held in alignment by the loose abutment of the tang ends with the respective inner planar walls 36 and 52 on the node and strut couplings respectively.

Containment latch 30 takes the form of a helical spring 60 which is slid over the cylindrical surface 48 of strut coupling 28 and containment sleeve 62 which extends over the spring 60 and a portion of the strut 14. Containment sleeve 62 has an internal shoulder 64 which engages one end of spring 60. Spring 60 acts between collar 44 and shoulder 64 to move the sleeve 62 over the complementary dowel pin connections of the node coupling 26 and the strut coupling 28. When the sleeve 62 is moved to the left as shown by arrow 66 in FIG. 5, the dowel pin 58 can be moved out of the sliding fit hole 54 of tang 38 of the node coupling 26. Likewise, in this position, the node coupling 26 can be assembled to the strut coupling 28, independently or as it is attached to a node 12.

Node coupling 26 has a conical node connection end 68 terminating in an annular node engaging surface 70 which coacts with the flattened surface 72 surrounding each of the threaded apertures 24. Containment sleeve 62 has a conical surface 74 which matches conical surface 68 when the containment sleeve is in its latching position with the sleeve end 76 abuting against the node coupling shoulder 78. External surface 90 of the containment sleeve 62 is knurled to provide better finger purchase.

Rotatable coupling assembly 22 is similar to stationary coupling assembly 20 and is shown in detail in FIG. 6, and the same numerals are used to identify corresponding parts. The node coupling 26 is identical in both couplings 20 and 22. The strut coupling 28 in the rotatable coupling 22 is constructed with two parts, namely, a tubular element 80 and a swivel element 82. Like the stationary strut coupling 28, the tubular element 80 has a tube engaging cylindrical portion 42, a stop collar 44 and a forward spring receiving cylindrical portion 48. The swivel element 82 has an internal thread 84 at one end which is engaged by shoulder screw 86 passing through the open center 88 of the tube swivel element 80 to draw the swivel element 82 into rotating abutment with the shoulder of the screw. Tang portion 50 and its dowel pin hole 56 is identical to the corresponding end of the stationary strut coupling element 28.

The embodiments of the invention in which an exclusive property or privilege is claimed are defined as follows:

1. A modular frame structure comprising, in combination:
    a pair of nodes having a generally spherical configuration with a plurality of radially extending threaded apertures arranged in a predetermined pattern;
    a strut designed to extend between adjacent nodes in forming said frame structure;
    a pair of mode couplings each having one end threaded for engagement with a threaded node aperture and each having an elongated tang at its other end;
    a pair of strut couplings, one coupling having at one end means for permanent fixed attachment to one end of said strut, and the other coupling having at one end means for permanent attachment to the other end of said strut allowing rotational movement between said other coupling and said strut; and both strut couplings having elongated tangs at their other ends arranged for positioning in overlapping complementary relation to said node coupling tangs; and
    complementary lock elements on each of said node coupling and strut coupling tangs engageable with each other when said tangs are in said overlapping position to hold said node couplings and strut couplings in fixed longitudinal alignment.

2. The modular frame structure according to claim 1 wherein said complementary lock elements include a transversely projecting pin in one of said tangs and an aperture to receive said pin on the other of said tangs.

3. The modular frame structure according to claim 2 further including latch means movable from a first position preventing release of said overlapped tangs to a second position allowing engagement and disengagement of said tangs.

4. The modular frame structure according to claim 1 further including latch means movable from a first position preventing release of said overlapping tangs to a second position allowing engagement and disengagement of said tangs,
    said movement from said first position to said second position being partially resisted by a helical spring provided peripherally about said strut.

5. A modular frame structure comprising, in combination:
    a node having a generally spherical configuration with a plurality of radially extending threaded apertures arranged in a predetermined pattern;
    a strut designed to extend between adjacent nodes in forming said frame structure;
    a node coupling having one end threaded for engagement with a threaded node aperture and having an elongated tang at its other end;
    a strut coupling having at one end means for permanent attachment to said strut and having an elongated tang at its other end arranged for positioning in overlapping complementary relation to said node coupling tang;
    complementary lock elements on each of said tangs engageable with each other when said tangs are in said overlapping position to hold said node coupling and strut coupling in fixed longitudinal alignment;
    said complementary lock elements including a transversely projecting pin in one of said tangs and an aperture to receive said pin on the other of said tangs; and
    said transversely projecting pin being a dowel pin received with a press fit into an aperture in one of said tangs and received with a sliding fit in the aperture of the other of said tangs.

6. The modular frame structure according to claim 1 wherein the means for attaching said the other strut coupling to said strut said means comprising a shoulder screw rotatably mounted substantially within said strut.

7. A modular frame structure comprising, in combination:

a node having a generally spherical configuration with a plurality of radially extending threaded apertures arranged in a predetermined pattern;

a strut designed to extend between adjacent nodes in forming said frame structure;

a node coupling having one end threaded for engagement with a threaded node aperture and having an elongated tang at its other end;

a strut coupling having at one end means for permanent attachment to said strut and having an elongated tang at its other end arranged for positioning in overlapping complementary relation to said node coupling tang;

complementary lock elements on each of said tangs engageable with each other when said tangs are in said overlapping position to hold said node coupling and strut coupling in fixed longitudinal alignment;

said means for permanently attaching said strut coupling to said strut allows rotational movement between said coupling and said strut; and said strut coupling including:
a tubular element, one end of which extends into and is permanently attached to said strut, and the other end of which extends outwardly from said strut;
a swivel element internally threaded at one end and having an elongated tang at its other end; and
a shoulder screw extending through said tubular element into threading engagement with said swivel element drawing said swivel element into abutment with said tubular element at the screw shoulder.

8. The modular frame structure according to claim 4 wherein said latch means includes a containment sleeve extending over said strut and movable from a first position covering said tangs preventing release thereof to a second position exposing said tangs for engagement and disengagement thereof, said spring being fitted within said containment sleeve.

9. A modular frame structure comprising, in combination:
a node having a generally spherical configuration with a plurality of radially extending threaded apertures arranged in a predetermined pattern;
a strut designed to extend between adjacent nodes in forming said frame structure;
a node coupling having one end threaded for engagement with a threaded node aperture and having a cylindrical portion at its other end with a segment removed to form a segmental shaped inner planar wall and a tang with a segmental cross-section extending longitudinally therefrom;
a strut coupling having at one end means for permanent attachment to said strut and having a cylindrical portion at its other end with a segment removed to form a segmental shaped inner planar wall and a tang with a segmental cross-section extending longitudinally therefrom for positioning in overlapping complementary relation to said node coupling tang;
each of said tangs having an aperture therein with a aperture in one of said tangs being sized to receive a dowel pin therein with a press fit and the aperture in the other of said tangs receiving said dowel pin in sliding engagement;

said apertures being positioned longitudinally in said tangs so that when the dowel pin engages the hole with a press fit in one of said tangs and engages the hole with the sliding fit in the other of said tangs, the ends of each tang abut the inner planar wall of the other coupling thereby holding said node and strut coupling in fixed longitudinal alignment, connecting said strut to said node; and latch means movable from a first position preventing release of said couplings to a second position allowing engagement and disengagement of said couplings.

10. The modular frame structure according to claim 9 wherein the means for permanently attaching said strut coupling to said strut allows rotational movement between said coupling and said strut.

11. The modular frame structure according to claim 10 wherein said strut coupling includes:
a tubular element, one end of which extends into and is permanently attached to said strut, and the other end of which extends outwardly from said strut;
a swivel element being internally threaded at one end and having a cylindrical portion at its other end with a segment removed to form a segmental shaped inner plannar wall and an elongated tang with a segmental cross-section extending longitudinally therefrom; and
a shoulder screw extending through said tubular element into threading engagement with said swivel element drawing said swivel element into abutment with said tube swivel element at the screw shoulder.

12. The modular frame structure according to claim 9 wherein said node coupling element has an annular shoulder between said threaded end and said cylindrical portion and said strut coupling has a longitudinally extending cylindrical surface from its tang end to its attachment end; and wherein said latch means includes:
a helical spring extending over the longitudinally extending cylindrical surface of said strut coupling; and
a containment sleeve having one end extending over said spring and a portion of said strut, said sleeve having an internal shoulder for engagement with one end of said spring to hold the other end of said sleeve against the annular shoulder of said node coupling with said spring in a partially compressed condition with the sleeve preventing disengagement of said tang elements in said first position of said latch means, said sleeve being movable over a further portion of said strut, further compressing said spring and exposing said tangs for disengagement and engagement of said tangs in said second position of said latch means.

13. The modular frame structure according to claim 9 wherein said strut coupling has a longitudinally extending cylindrical surface from its tang end to a point intermediate its attachment end and its planar wall allowing the cylindrical portion at the attachment end of said strut coupling to extend into said strut to abut said collar against the end of said strut for permanent attachment thereto.

* * * * *